United States Patent [19]

Hillis

[11] Patent Number: 5,303,297
[45] Date of Patent: Apr. 12, 1994

[54] DYNAMIC PRICING METHOD AND APPARATUS FOR COMMUNICATION SYSTEMS

[75] Inventor: Durrell W. Hillis, Chandler, Ariz.

[73] Assignee: Motorola, Inc., Schaumburg, Ill.

[21] Appl. No.: 735,733

[22] Filed: Jul. 25, 1991

[51] Int. Cl.$^5$ ............................................ H04M 11/00
[52] U.S. Cl. ...................................... 379/63; 379/58; 379/61; 379/111; 379/114; 379/133
[58] Field of Search ................... 379/58, 59, 60, 61, 379/91, 111, 113, 114, 116, 119, 132, 133, 135, 136, 143-145, 155, 357, 63, 128, 126, 124

[56] References Cited

U.S. PATENT DOCUMENTS

| | | | |
|---|---|---|---|
| 4,640,986 | 2/1987 | Yotsutani et al. | 379/63 X |
| 4,706,275 | 10/1987 | Kamil | 379/154 X |
| 4,751,728 | 6/1988 | Treat | 379/113 |
| 4,776,000 | 10/1988 | Parienti | 379/144 X |
| 4,951,308 | 8/1990 | Bishop et al. | 340/825.35 X |
| 5,020,090 | 5/1991 | Morris | 379/56 X |
| 5,109,401 | 5/1992 | Hattori et al. | 379/91 X |
| 5,109,405 | 4/1992 | Morganstein | 379/67 X |
| 5,119,504 | 6/1992 | Durboraw | 455/54.1 |
| 5,173,933 | 12/1992 | Jabs et al. | 379/58 |

FOREIGN PATENT DOCUMENTS

| | | | |
|---|---|---|---|
| 3305978 | 8/1984 | Fed. Rep. of Germany | 379/114 |
| 0093361 | 7/1980 | Japan | 379/112 |
| 0111456 | 6/1984 | Japan | 379/114 |
| 0190164 | 7/1989 | Japan | 379/112 |

*Primary Examiner*—Curtis Kuntz
*Assistant Examiner*—George Oehling
*Attorney, Agent, or Firm*—Robert M. Handy; Gregory J. Gorrie; Frederick M. Fliegel

[57] ABSTRACT

A communication system service billing arrangement is described that adapts to system loading in realtime. As system loading varies, one or more individual subscribers units (ISU) of a communication system are provided with realtime information on the current cost of the communication service. The system determines the locations of the ISUs and the current loading there between and calculates a calling rate based at least on the current loading. This calling rate is sent to at least one of the ISUs whose operator can choose to connect or not connect the call between the ISUs based on the current realtime variable rate.

35 Claims, 3 Drawing Sheets

DYNAMIC PRICING METHOD AND APPARATUS FOR COMMUNICATION SYSTEMS

FIELD OF THE INVENTION

The present invention pertains to communication systems with dynamic pricing.

BACKGROUND OF THE INVENTION

Present communication system pricing methods rely on fixed, prepublished pricing based upon call duration, call distance, time of day and day of the week. Based on these parameters, the user can determine what the price per service will be prior to the placement of the call. The pricing matrix for local calls is generally given in the Telephone Books from the local service provider. The pricing matrix for a long distance call is based generally on the same parameters but with the call distance being a larger factor. The pricing matrix is of a fixed nature and changes infrequently.

A feature generally found in long distance pricing structure is the practice that the cost rate for the call is based on the price structure of the one who originates the call. For example, in a call from Los Angeles, CA, where the time is 4:00 P.M. Pacific Standard Time, to New York, N.Y., where the time is 7:00 P.M. Eastern Standard Time, the cost of the call is based on the rate in effect in Los Angeles at the time of the call, which in this case is the more expensive daytime rate. If the call had originated in New York the cost of the call would be based on the evening rate, which is lower than the daytime rate. This type of fixed pricing matrix structure is well established. Its historical roots are a result of the generally fixed nature of the physical plant used to provide the service, that is, the wires and other transmission means have known physical locations. Calls are made from one fixed geographical location to another. Thus, the associated cost per service is easily calculated and published or otherwise available to the user of the service.

Even with published rates there has been a need for callers to have a simple way to predict the cost of calls of different distance and duration, rather than merely waiting for the bill from the Phone Company. Apparatus for this is generally called a Telephone Call Metering device.

U.S. Pat. No. 4,264,956, issued to John M. Delany and U.S. Pat. No. 4,751,728, issued to John M. Treat and U.S. Pat. No. 4,122,308 issued to Gerald J. Weinberger et al; describe Telephone Call Metering devices. Various communication billing computation systems and the like are shown. These devices use or are based on the fixed published pricing matrix (described above). Typically, the user inputs the call distance (e.g. by Area Code) and call rate ($/min-Area Code) applicable for the time of day when the call is to be made, and the device calculates an estimate of the telephone charge depending on the call duration.

With these arrangements the pricing parameters are loaded into the Telephone Call Metering Device by the user and not by the provider of service. A disadvantage of this is that as rates change due to regulatory or other actions, the Telephone Call Metering Device must be up-dated by the user or else the displayed costs will not be accurate. Or, if a call is made to a region not programmed then no costs can be displayed. The displayed costs are only an estimate of the actual cost based on the published cost matrix and the time-distance parameters at the time when the information is loaded into the Telephone Call Metering Device.

Other Telephone Call Metering devices are those used with Pay-for-service telephones, or as they are generally called, "Pay Phones". Pay Phone systems indicate the basic charges for the call via aural or visual display means, so that the user can determine how much currency must be deposited before the provider of service will permit the call to be completed. In the case of a long distance call from a Pay Phone, the service is terminated after a fixed period of time unless the originating user deposits within the Pay Phone additional currency to keep the connection open.

A difficulty with the above described approaches is that they do not take into account realtime demand for the service. Specifically, the fixed price matrix on which the call charge is based relies on an average time-of-day usage assumption and is changed only infrequently. Service charges to the user are not revised on a real time basis. With prior art systems, there is no mechanism for having the call service charge reflect the real time demand for the particular line or set of lines being used.

The advent of cellular phone systems and in particular satellite and/or cellular telephone systems makes it highly desirable to have a service billing system that adapts to system loading in real time or nearly real time. The number of simultaneous user that such a system can handle is generally much smaller than with wire line service. This problem is especially severe with satellite cellular telephone systems. As system loading varies, it is highly desirable to simultaneously vary the rate structure.

The nature of cellular telephone and data communication systems, especially satellite systems, creates a further problem in that users have little or no geographical restrictions on the locations in which they may place calls or receive calls. The old fixed price matrix method used with wire lines of fixed location or with terrestrial cellular systems of very limited geographical range are difficult to apply to satellite cellular telephone systems and large area terrestrial cellular systems. Currently, operators of the systems have no way of varying the rates in real time and users of said systems have no means of knowing the instantaneous rate prior to and during the placement of a call.

As used herein the terms "telephone system" and "telephone service" are intended to include both voice and data transmission.

SUMMARY OF THE INVENTION

The foregoing and other problems are overcome and needs satisfied by a method for providing one or more individual subscriber units (ISU) of a communication system with realtime information on the cost of the communication service by determining the calling rate based on ISU location and system loading, sending the calling rate to one or more of the ISUs, and thereafter connecting or not connecting a call between the ISUs based on a response from the operator of the ISU.

The forgoing and other problems are overcome and needs satisfied by apparatus for providing one or more ISUs of a communication system with realtime information on a current calling rate of a communication service. The apparatus comprises: means for determining a first location of a calling ISU and a second predicted or actual location of a called ISU; means for computing a current calling rate based in part on current realtime usage of the communication system for at least one of the first or second locations; means for sending said calling rate to one of the ISUs; and means for connecting or not connecting a call between the calling and called ISU based on a response from the operator of the calling or called ISUs.

In a further embodiment, information on a realtime comlink loading dependent cost adder or cost multiplier for the local ISU comlink is sent to the ISU without it interrogating the communication system.

DESCRIPTION OF THE PREFERRED EMBODIMENT

Figure 1:
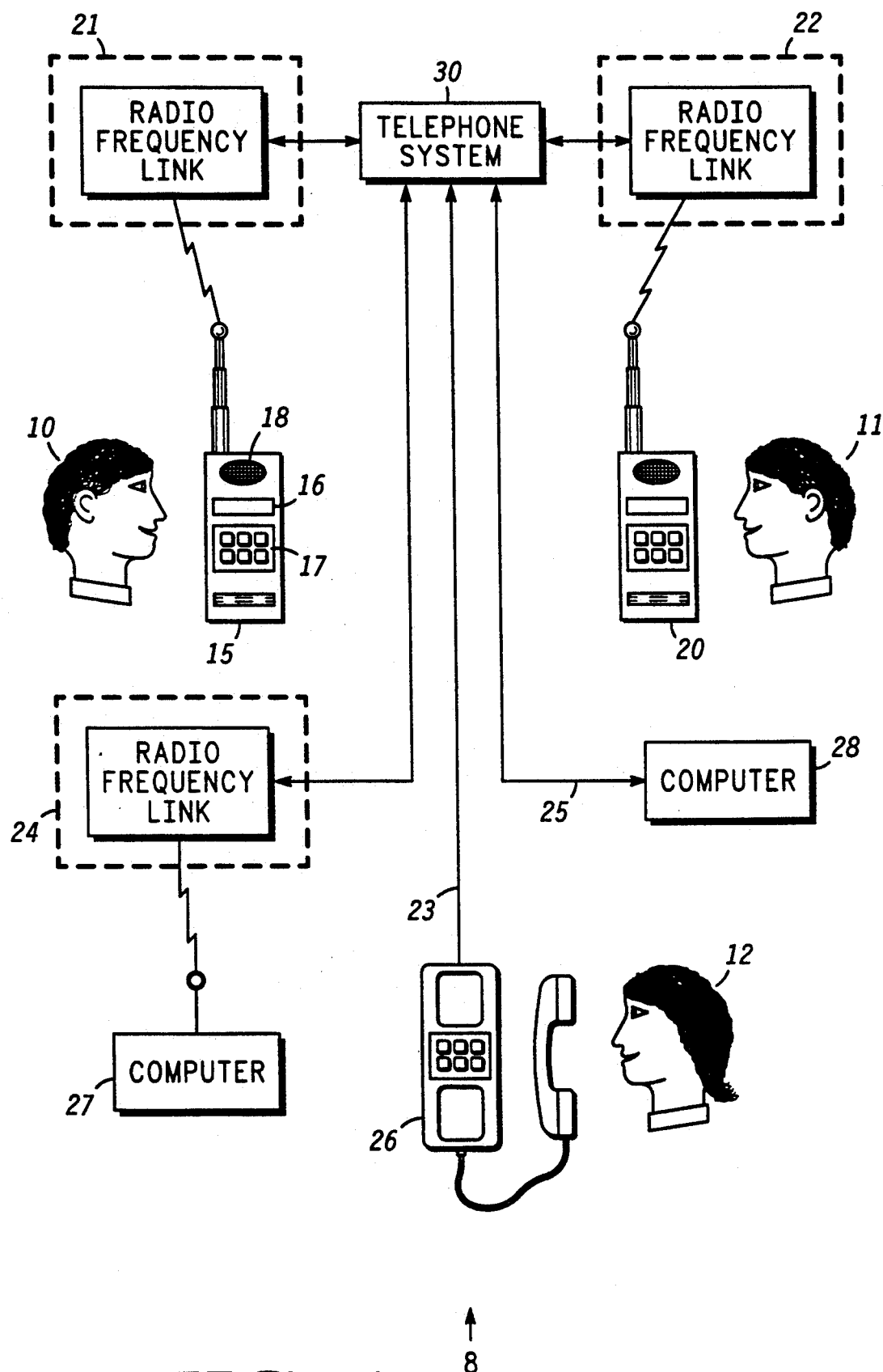
FIG. 1 is a simplified block diagram illustrating a preferred embodiment of a communication system according to the present invention.

Referring to FIG. 1, a simplified block diagram illustrating a preferred embodiment of communication system 8 according to the present invention is shown. The operation of communication system 8 is illustrated as follows: call initiating user 10 enters into individual subscriber unit (ISU) 15 via keypad 17 a number of another ISU 20 to which user 10 desires to be connected. The term "ISU" is intended to refer to any information or communication device or apparatus that may be used to communicate information, as for example but not limited to a telephone, a cellular telephone, a fax transceiver, a modem, a computer, or other communication means.

ISU 15 transfers the desired telephone number being called via comlink 21 to telephone system 30. The term "comlink" is intended to refer to any communication linking device or network that any user of the system may use to communicate information to telephone system 30, as for example but not limited to optical links, radio frequency links, wire lines, or other communication linking means. A comlink can usually handle many simultaneous communications but will have a maximum handling capability limited by its particular implementation. A wirebased comlink may serve hundreds of thousands of users while a satellite cellular based comlink may serve as few as a thousand. Telephone system 30 will generally interface with many comlinks. For ease of understanding when reference is made to an ISU using a comlink it is understood that the ISU may only be using a portion of the capacity of the comlink and that others may be using the comlink at the same time.

Telephone system 30 computes the calling rate and transfers the rate information back to ISU 15 via comlink 21. The rate information is indicated to user 10, for example, via display 16 on ISU 15. A short tone is also desirably generated at earphone 18 of ISU 15 to alert user 10 to the arrival of the rate information. A flashing light or display 16 is also desirably visible on ISU 15 to alert user 10 to the arrival of the rate information.

User 10 may read the displayed rate information and decide whether or not the call is affordable. If the answer is no, user 10 need do nothing and telephone system 30 will disconnect ISU 15 after a predetermined time or user 10 may hang up. The predetermined time may be selected by user 10 or telephone system 30 as a normal part of the communication service.

If user 10 decides that the call is affordable then user 10 presses a "call" or other button on keypad 17. The button causes a signal to be sent via comlink 21 to telephone system 30 indicating that the call is desired to be connected. Telephone system 30 then places the call, via comlink 22 and ISU 20, to user 11.

As long as there is a connection from user 10 to user 11 via telephone system 30, telephone system 30, optionally, continues to update the rate information and transfer the rate information via comlink 21 to the originator and, optionally via comlink 22 to the receiver of the call. Depending on the option chosen by the user or the telephone system administrator (not shown), this may continue until one of the parties disconnects the call. This is desirable but not mandatory. Alternatively, rather than continuously updating the rate information displayed to one or both users, the system may be set to update the rate indicator at the ISU only when the rate exceeds a particular threshold amount.

Sometimes user 10 will be the receiver of calls. For example, a call is placed by originating user 12 via ISU 26, wire line comlink 23, telephone system 30 and comlink 21 to ISU 15. The rate of the call may not be displayed on ISU 26. In this instance the rate for the call is not of interest to user 12 as the call will be connected if user 10 answers ISU 15.

Prior to user 10 answering the call user 10 may look at display 16 to see if the rate is acceptable. If it is not, then user 10 simply does not answer ISU 15. If the rate is acceptable, user 10 answers ISU 15 and telephone system 30 continues to update the rate information as before. User 12 may or may not be charged the dynamic rate for the call. ISU 26 may not have means for indicating to user 12 the cost for the demand based service. In this situation, the cost for the dynamically based portion of service may be borne by user 10, who is aware of the rate being charged for the use of the service.

Another form of ISU is computer 27. Computer 27 having a need to communicate with computer 28, transmits via comlink 24 the telephone number of computer 28 to telephone system 30. Telephone system 30 then computes the service rate and transmits this information back to computer 27 via comlink 24. Should the rate fall within preprogrammed limits stored in memory accessible by computer 27, then computer 27 sends a signal to telephone system 30 to connect the call. Telephone system 30 desirably continues to update the rate for the call to computer 27 or computer 28 or both as long as the call is connected.

In the case of a call originating from computer 28 and ending at computer 27 the system indicates to computer 28 what the charge is for the use of comlink 24 and wire line comlink 25, and then computer 28 can make a decision of whether to connect the call. When only one of the comlinks is a rate variable link, the computer at either or both ends may be informed of the rate of the call before the placement of the call and during the call. The benefit is where a portable computer (e.g. computer 27) is communicating with the home office computer (e.g. computer 28) then either or both computers can make a determination of what rate is acceptable. Either computer can poll the telephone system 30 to determine when the rate for service is at a level where the system can be utilized according to the guidelines programmed within the respective computers and cause such calls to be initiated. In addition, in the middle of a communication, should the rate rise above the preset range, the call can be terminated and later reconnected when rates are lower. It is also possible to print the rate and other information on a printer (not shown) that could be part of computer 27 or 28.

A method and means for locating the originating and/or receiving ISU is provided so that telephone system 30 can compute the correct rate. Many ISUs are very easily located as they are part of the fixed wire telephone system and the telephone number indicates the location of the ISU. For the ISUs that are not tied to a fixed location the telephone number alone does not identify the ISU location. There are a number of well known locating arrangements, as for example, by use of the cell location if the ISU is within a limited range cellular system or by use of a global positioning system (GPS) or a combination thereof. GPS is a commonly known means of accurately pinpointing the location of a GPS receiver utilizing one or more satellites.

ISU 15 or 20 using comlink 21 or 22 incorporates geolocation apparatus and is capable of being located by telephone system 30 or capable of self-location and transferring such self-location information to telephone system 30. Alternatively, for cell based systems, the presence of an ISU within a cell may be sufficient geolocation information. In the latter situation telephone system 30 knows which cell contains the ISU without the ISU having to have any internal geolocation capability.

Figure 2:
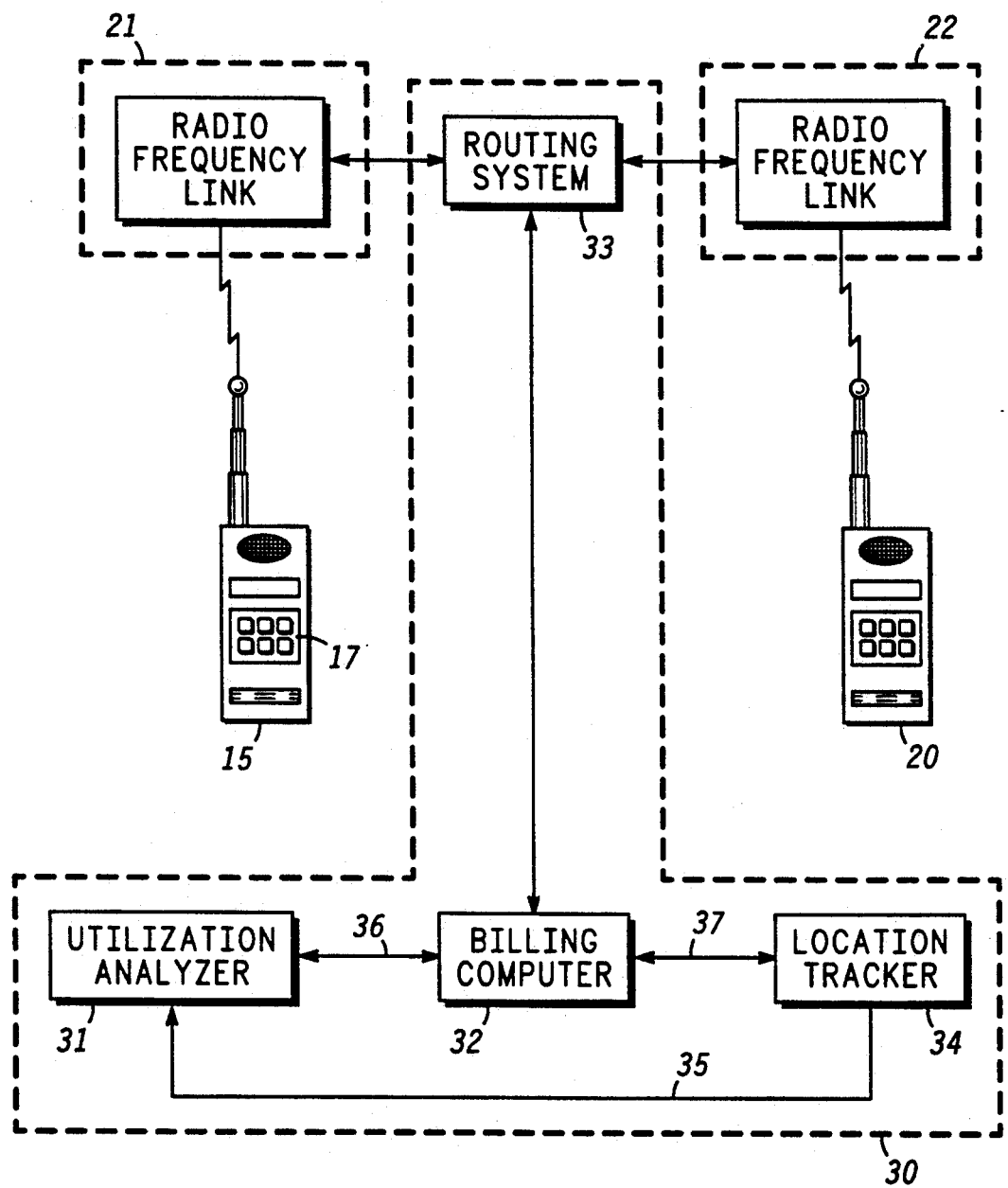
FIG. 2 is a simplified block diagram illustrating a preferred embodiment of the present invention in further detail.

FIG. 2 is a block diagram of telephone system 30 of FIG. 1 in more detail. Referring to FIG. 2, a preferred method for determining rates is described. However, this is intended for convenience of explanation and is not meant to be limiting.

Assume ISU 15 utilizes comlink 21 to originate a call. ISU 15 communicates the desired connection number to telephone system 30. Telephone system 30 comprises utilization analyzer 31, billing computer 32, routing system 33 and location tracker 34. These may exist as separate defined hardware modules or as functions created by software programming of a general or special purpose computer or a combination thereof.

When telephone system 30 receives from ISU 15 the desired connection number, i.e. the phone number of the ISU being called, it also receives or determines information concerning the geolocation of both ISU 15 and the ISU being called. The geolocation may come, for example, from a GPS receiver built into the ISU or by identifying the cell containing the ISU or, should the ISU be of a fixed wire nature, by the area code. Location tracker 34 of telephone system 30 determines the actual locations of the originating caller and the destination being called, computes the separation distance (e.g.Km) and transfers distance information or equivalent to billing computer 32 via link 37 and the location information, via link 35, to utilization analyzer 31. The location tracker can be implemented using a general purpose computer programmed, for example, to compute the distance between locations using a curved surface algorithm. The location tracker computer memory can easily store the known location of the wire lines and the computer can compute the location of the mobile ISU or can be informed of the ISUs' location by the ISUs' self-geolocation capability.

Utilization analyzer 31 is conveniently a general purpose computer programmed to monitor the capacity usage of the comlink network and the routing system 33. It determines the amount of capacity being utilized at the time of the call. If the call is to ISU 20 utilizing comlink 22 then utilization analyzer 31 may consider the loading of comlink 22 as well as loading of comlink 21 and convey a composite loading to billing computer 32 via link 36. Computer systems for monitoring communication system loading are well known in the art and used, for example, by long distance carriers to determine the manner in which traffic should be routed in order to provide the maximum system utility.

Billing computer 32, comprising both hardware and software, is of the type normally used in existing cellular and other telephone system but with additional modifications so as to: (1) notify the user or others of the realtime, current billing or calling rate; (2) allow the billing or calling rate to be variable; (3) allow the users to decide based on current rate information, if the call is to be placed or accepted; and (4) update the billing rate and notify the user on an ongoing basis. Billing computer 32 computes a rate (e.g.$ per Minute) for the call based, for example, on the distance and current system loading.

Once billing computer 32 has computed the rate to charge, this information is sent back to ISU 15 over comlink 21. The user (e.g. a person or computer) at ISU 15 makes a decision as to the cost/benefit of the call and, if the rate is acceptable, presses a "call" button on the keypad 17 of ISU 15 or makes an equivalent signal. This response is conveyed via comlink 21 to billing computer 32 which in turn commands routing system 33 to connect the call. Routing system 33 is similar to the type currently in use by the long distance carriers and the cellular telephone providers.

While the call is in progress, location tracker 34 continues to track the geolocation of the ISUs. This is important as one or both ISUs may be moving and may enter locations with a different capacity e.g. having a different comlink. Should the ISUs move to different regions such that the capacity or loading of comlink 21 or 22 changes, information of this change is conveyed to utilization analyzer 31 via link 35. This moving of ISUs into different comlinks is a particular problem in the existing fixed price cellular systems as the handoff between cells, or comlinks as they are called herein, does not always occur due to some comlinks being at maximum utilization. The utilization analyzer 31 continually monitors the capacity of comlinks 21 and 22 and conveys changes in capacity utilization to the billing computer 32. When the capacity utilization changes, billing computer 32 recomputes the rate. When the rate changes, billing computer 32 notifies the users via comlink 21 and/or comlink 22 of the new rate. This process continues until the call is terminated. The frequency with which rate information is updated to the user is usefully in the range of once every thirty seconds to once every hour, preferably about once every forty-five seconds to once every five minutes, and more typically about once a minute. Further, the update frequency may increase as the rate and/or rate of change of the rate increases and decrease as the rate and/or rate of change of the rate decreases.

If the call is to a fixed location, e.g. a terrestrial wire telephone exchange and wired subscriber unit, utilization analyzer 31 need only analyze the loading of comlink 21 and convey this information to billing computer 32 via link 36. Alternatively should a "conference call" to or between more than two ISU's simultaneously be desired the Utilization analyzer may need to analyze every comlink and compute a composite loading. Loading is the amount of communication capacity being used at that time between the calling and called locations.

Figure 3:
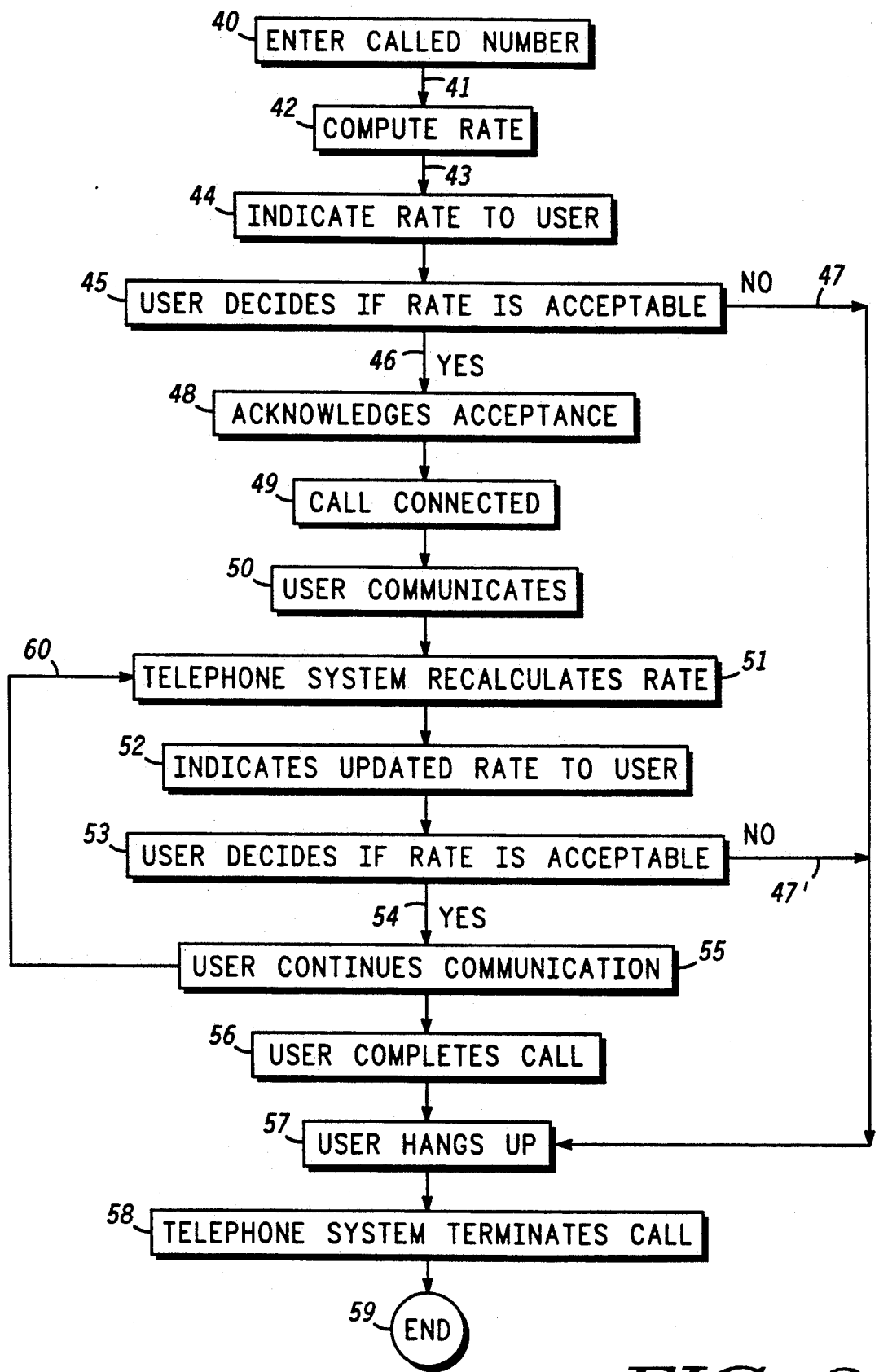
FIG. 3 is a simplified flow diagram illustrating the operation of the communication system of the present invention.

FIG. 3 shows a simplified flow diagram of the process that occurs in telephone system 30. The process starts with block 40 when a user enters a number to be called into the ISU.

The origination and destination information is transferred, as indicated by arrow 41, to block 42 where the telephone system determines the rate in effect at that time based on loading between the originating and destination locations of the call. The system loading information is generated by utilization analyzer 31 of telephone system 30. The distance of the call is also determined from information provided by location tracker 34. Utilizing this information the rate of the call (e.g.,$ per minute) is calculated by billing computer 32 of telephone system 30.

The rate is transferred, as indicated by arrow 43, back to the users' ISU, in block 44 where the rate (e.g.,$ per minute) is displayed to the user. In block 45 the user makes a determination of whether to initiate the call based on the rate presented. Should the user decide that the call is too expensive, as shown by arrow 47, the user merely hangs up, as in block 57. When the user hangs up, as indicated by block 57, telephone system 30 terminates the call, as indicated by block 58. At this point the process ends, i.e. block 59.

Should the user determine that the rate of the call is acceptable then the user acknowledges acceptance, as indicated by arrow 46 to block 48. Block 48 causes the ISU to notify telephone system 30 that the call is to be connected. Telephone system 30 then connects the call, as in block 49.

While the user communicates as indicated in block 50, various actions are occurring in telephone system 30, as shown by block 51. Utilization analyzer 31 continues to monitor the system loading. When a change in the loading occurs, new system loading information is passed to billing system 32 which determines a new rate for the service and transmits the new rate back to the users' ISU. The rate is indicated to the user via the ISU as shown in block 52.

In block 53, the user makes a determination of whether to continue the call based on the indicated rate or may choose to ignore the rate entirely. Should the user decide that the rate is no longer cost effective, as indicated by arrow 47', then the user merely hangs up as shown in block 57. When the user hangs up, i.e. block 57, the telephone system 30 terminates the call, as shown by block 58. At this point the process ends, as shown by block 59. Should the user choose to continue, as indicated by arrow 54, the user merely continues to use the ISU, as shown by block 55. At this point the process from block 51 thru block 55 repeat at intervals determined, for example, by telephone system 30. Arrow 60 shows the path from block 55 to block 51.

When the user completes the call, i.e., block 56, then the user hangs up, block 57. When the user hangs up in block 57, telephone system 30 terminates the call in block 58. At this point the process ends in block 59.

In a preferred implementation the call rate is composed of a base fee for long distance access plus or times a charge that is based preferably on the distance and loading, where loading is a number arrived at by analyzing the communication system capacity utilization at one or both ends of the call and/or in between. That is, for a call placed from a low demand area to a low demand area the call will have low loading and thus have a minimal rate. For a call placed from a low demand area to a high demand area then the loading will be substantial and, thus, the rate of the call will be higher. For a call from a high demand area to a low demand area then the loading will also be substantial and, thus, the rate of the call will also be higher. For the call placed from a high demand area to another or the same high demand area the loading will be even greater and thus the rate will be still higher. The intent of the loading variable rate is to encourage the use of the services in non-peak usage periods in realtime. This is accomplished by providing lower realtime rates when loading is small and by higher realtime rates discouraging use of the system when the communication systems capacity is at or near maximum utilization.

The user of the service is desirably provided with the cost of the service (i.e. the call rate) in realtime just prior to and, optionally, during the call. This feature whereby the user knows the charge rate for the call in realtime provides various other benefits as well.

For example, the users' ISU can be set to automatically poll the communication system and place a call when the rate falls below a first predetermined rate or to terminate the call when the rate exceeded a second predetermined rate. In addition, the user of the services can have an immediate billing for the services should they so desire. The latter would be of immediate use in connection with pay telephones. Communication systems as currently implemented do not allow for the most efficient use of the equipment. During periods of heavy use not all users may be able to complete their calls. Further the prior art does not provide a means to dynamically change prices to encourage the use of the service when demand is low nor are there means for the user to determine the availability of the service nor make a choice on rates. These problems are overcome by the present invention.

In a further embodiment the loading sensitive rate may be divided into, for example, two components of charges, a first charging rate or premium for use of the local comlink depending on the system and/or local comlink loading and a second charging rate based on the usual calling distance and time parameters. The first rate may be an adder or a rate multiplier. The second rate can be substantially independent of the loading dependent rate. This formulation of the rate avoids the ISU having to poll or call the telephone system to determine the loading dependent parameters.

For example, the rate for local comlink 21 is constantly or periodically broadcast using an available paging channel of communication system 8 or during unoccupied signalling segments of, for example, a time multiplexed signal. Thus, user 10 of ISU 15 would merely turn ISU 15 on and display 16 would display the current rate for use of local comlink 21 or other capacity limited portions of the system. The arrival of the rate may be indicated by an annunciator, e.g., a flashing light and/or an audible tone. User 10 may read the displayed rate and decide whether or not the adder or multiplier for the capacity limited portions of the system, e.g., the local comlink, is affordable. If the answer is no, user 10 does nothing. The ISU continues to receive the rate and display the updated rate as long as it is on. If user 10 decides that the local comlink input rate is affordable then user 10 enters the desired connection number on keypad 17 and the system calculates the total call rate based on the location being called, as has been previously described, and, after user approval, connects the call in the manner described earlier. It is easily seen that user 10 could just as easily be computer 27 with the appropriate programming.

Having thus described the present invention, it is apparent that the present invention provides a method and means whereby the user of the communication service is informed of the realtime, loading variable costing rate or cost premium of telephone communication service immediately prior to and optionally, also during a call. The costing rate or cost premium is dependent on the demand for service at that particular time for the caller or the receiver or both, depending on the circumstances.

While the invention is described with specific preferred embodiments, it is evident that many alternatives and variations will be apparent to those skilled in the art based on the description herein. More specifically the invention has been described for a particular satellite communication method, although the method is directly applicable to other communication systems, as well as to automated data communication systems and other personal communication devices.

What is claimed is:

1. A method for providing one or more mobile individual subscriber units (ISU) of a communication system with realtime information on the cost of a communication service, wherein the communication system has a realtime demand for communication services and includes a radio link, said method comprising steps of:
   (a) determining a current loading of said communication system based on said realtime demand for communication services;
   (b) dynamically computing a current calling rate by the communication system, the current calling rate based in part on said current loading of the communication system;
   (c) sending the current calling rate to one of a calling and a called ISUs; and
   (d) thereafter connecting or not connecting a call between the calling and the called ISU based on a response from one of the calling or the called ISUs.

2. A method as claimed in claim 1, additionally comprising the steps of:
   (a1) determining by a geolocation apparatus, at least one of a first location of the calling ISU and a second predicted or actual location of the called ISU;
   (a2) reporting the first location to the communication system by the calling ISU; and wherein,
   said step (b) comprises a substep (b1) of computing the current calling rate based in part on a distance between the first and second locations, wherein the distance is computed based on one of said first location of said calling ISU and said second predicted or actual location of said called ISU as determined in said step (a1).

3. A method as claimed in claim 1, wherein said step (c) further comprises substeps of:
   conveying the current calling rate to one of the calling and the called ISUs; and
   displaying thereon the current calling rate.

4. A method as claimed in claim 1, wherein said step (c) further comprises substeps of:
   conveying the current calling rate to one of the calling and the called ISUs; and
   printing the current calling rate on a printer contained in the one of the calling and the called ISUs.

5. A method as claimed in claim 1, wherein said step (c) comprises a substep of conveying the current calling rate to one of the calling and the called ISUs for storage in a memory.

6. A method as claimed in claim 2, wherein said step (a1) comprises a substep of determining locations of more than two ISUs desired to be simultaneously connected.

7. A method as claimed in claim 1, wherein said steps (c) and (d) comprises substeps of:
   sending the current calling rate by the communication system to be calling ISU; and
   connecting or not connecting based on a response from only the calling ISU.

8. A method as claimed in claim 1, wherein said steps (c) and (d) comprises substeps of:
   sending the current calling rate by the communication system to the called ISU; and
   connecting or not connecting based on a response from only the called ISU.

9. A method as claimed in claim 2, wherein said step (a1) comprises a substep (a2) of computing a location utilizing geolocation information provided by one or more of the ISUs.

10. A method for providing one or more individual subscriber units (ISUs) of a communication system with realtime information on the cost of a communication service before or after a connection between the called ISU and the calling ISU has been made, wherein the communication system includes a radio link, said method comprising steps of:
    (a) determining a first location of the calling ISU and a second actual or predicted location of the called ISU, wherein at least one of said first or second locations is determined by a geolocation apparatus;
    (b) determining a first and second current loading for said first and second locations respectively, said first and second current loading based on a current demand for communication services at said first location or at said second actual or predicted location;
    (c) dynamically computing a current calling rate based in part on at least one of said first and second current loading for the first or second locations;
    (c) sending the current calling rate to one or all of the ISUs; and
    (d) thereafter continuing or not continuing a call between the calling ISU and the called ISU based on a response from one of the calling ISU or the called ISU.

11. A method as claimed in claim 10, wherein said step (c) comprises a substep of computing a current calling rate based in part on a distance between the first and second locations, wherein the distance is computed based on said determined first location of the calling ISU and said determined actual or predicted second location of the called ISU.

12. A method for providing one or more computer based individual subscriber units (ISUs) of a communication system with pre-programmed limits, each of said computer based subscriber units having a location associated therewith, each of said locations having associated therewith a current loading based on realtime demand for communication services and said communication system having a realtime billing rate for a communication service based in part on said current loading at said location, said method comprising steps of:

dynamically determining by one or more computer based ISUs whether said realtime billing rate of said communication service is within acceptable limits; and responding by the one or more computer based ISUs whether to accept or reject a connection and thereafter continuing or not continuing a call between the calling ISU and the called ISU based on the realtime billing rate staying within a second limit.

13. An apparatus for providing one or more individual subscriber units (ISUs) of a communication system with realtime information on a current calling rate of a communication service, wherein the communication system includes a radio link, said apparatus comprising:

means for determining a first location of a calling ISU and a second predicted or actual location of a called ISU, wherein said determining means comprises a geolocation apparatus;

means for determining a current loading at said first or second location based on a demand for communication services at said location;

means for dynamically computing a current calling rate based in part on said current loading of said communication system for at least one of said first or second locations;

means for sending said current calling rate to one of said calling and called ISUs; and means for connecting or not connecting a call between said calling and called ISUs based on a response from one of said calling or called ISUs.

14. An apparatus as claimed in claim 13, wherein said means for computing a current calling rate is further based in part on a distance between said first and second locations, wherein said distance is computed based at least in part on said determined first location of the calling ISU and said determined second predicted or actual location of the called ISU.

15. An apparatus as claimed in claim 13, wherein said means for determining locations comprises means for computing one or more locations utilizing geolocation information provided by one or more of said ISUs.

16. An apparatus as claimed in claim 13, further comprising one or more computer-containing ISUs having pre-programmed limits to determine whether said current calling rate is within predetermined limits for placing or continuing a call.

17. An apparatus for providing one or more ISUs of a communication system with current cost information of a communication service, each of said ISUs having a location associated therewith, each of said associated locations having associated therewith a current loading based on realtime demand for communication services, wherein the communication system includes a radio link, said apparatus comprising:

means for redetermining a first location of a calling ISU and a second location of a called ISU, said redetermining means including a geolocation apparatus;

means for dynamically recomputing a current calling rate based in part on said current loading associated with said redetermined locations for at least one of said called or calling ISU's to provide a recomputed current calling rate;

means for sending said recomputed current calling rate to one of said calling and called ISUs; and means for continuing or not continuing a call between said calling and called ISU based on a response from one of said calling or called ISUs.

18. A method for providing one or more individual subscriber units (ISUs) of a communication system with current cost information of a communication service, each of said ISUs having a location associated therewith, each of said associated locations having a current loading based on realtime demand for communication services, wherein the communication system includes a radio link, said method comprising steps of:

dynamically computing an input current calling rate or rate multiplier based in part on said current loading associated with said location of a multiuser portion of the communication system to which a first ISU has access; and sending the input current calling rate or rate multiplier to the first ISU.

19. A method as claimed in claim 18, further comprising steps of:

receiving from the first ISU identification of a destination desired to be called;

dynamically computing a destination calling rate relating to the destination to be called; and computing a total calling rate including the input current calling rate or rate multiplier and said destination calling rate.

20. A method as claimed in claim 18, wherein said sending step comprises a step of displaying the input current calling rate or rate multiplier on the first ISU.

21. A method as claimed in claim 18, wherein said sending step comprises a step of conveying the input current calling rate or rate multiplier to the first ISU for storage in a memory.

22. A method as claimed in claim 18, wherein said computing step comprises a step of computing an input current calling rate or rate multiplier proportional to the number of current users of a multiuser comlink of the communication system, wherein the multiuser comlink carries signals to or from the first ISU.

23. A method as claimed in claim 19, wherein said second computing step includes a step of adding the input current calling rate to the further calling rate.

24. A method as claimed in claim 19, wherein said third computing step further includes a step of multiplying the further calling rate by a factor determined by the input current calling rate.

25. A method as claimed in claim 1, wherein said computing step includes a step of updating said current calling rate at intervals based on changes in said current loading of the communication system.

26. A method as claimed in claim 10, wherein said computing step includes a step of updating said current calling rate at intervals based on changes in said current loading of the communication system for at least one of the first or second locations.

27. A method as claimed in claim 12, further including a step of updating said realtime billing rate at intervals based on changes in said current loading of the communication system for at least one of the locations associated with each of said computer based subscriber units.

28. An apparatus as claimed in claim 13, wherein said computing means includes means for updating said current calling rate at intervals based on changes in said current loading of said communication system for at least one of said first or second locations.

29. An apparatus as claimed in claim 17, wherein said dynamically recomputing means includes means for dynamically recomputing a current calling rate at intervals based on changes in said current loading of said communication system for at least one of said first or second locations to provide said recomputed current calling rate.

30. A method as claimed in claim 18, further including the steps of:
 computing an updated current calling rate at intervals based on changes in said current loading of the communication system for at least one of the first or second locations to provide said updated current calling rate;
 computing a total calling rate including said input current calling rate or rate multiplier, and said updated current calling rate; and
 sending the total calling calling rate to the at least one ISU.

31. A method as claimed in claim 25, wherein said computing step includes a step of computing a current calling rate at intervals of between once every thirty seconds to once every hour.

32. A method as claimed in claim 25, wherein said computing step includes a step of computing a current calling rate at intervals of between once every forty five seconds to once every five minutes.

33. A method as claimed in claim 25, wherein said computing step includes a step of computing a current calling rate at intervals of about once a minute.

34. A method dynamically computing a realtime cost for a communication service for one or more mobile individual subscriber units (ISU) of a communication system, wherein the communication system has a realtime current demand for communication services, said method comprising steps of:
 measuring a realtime current loading of said communication system based on said realtime current demand for communication services at a time when said communication service is desired; and
 dynamically computing a realtime calling rate for use by the communication system, the realtime calling rate based in part on said current loading of the communication system.

35. A method as claimed in claim 34, wherein the computing step is performed by said communication system.

* * * * *